United States Patent Office 2,983,732
Patented May 9, 1961

2,983,732

PROCESS FOR THE PREPARATION OF ORGANIC CYCLIC SULFITES

Emil J. Geering, Grand Island, N.Y., and Samuel J. Nelson, Bloomingdale, N.J., assignors to The Hooker Chemical Corporation, a corporation of New York No Drawing. Filed May 7, 1958, Ser. No. 733,500

14 Claims. (Cl. 260—327)

This invention relates to an improved process for the preparation of the reaction products of thionyl chloride and the Diels-Alder adducts of hexahalocyclopentadiene, wherein hexahalocyclopentadiene is the diene and an unsaturated dihydric alcohol is the dienophile. More particularly, this invention relates to the preparation of organic cyclic sulfites by preparing the Diels-Alder adduct of an hexahalocyclopentadiene, preferably hexachlorocyclopentadiene, and an unsaturated dihydric alcohol in the presence of a material selected from the group consisting of alkali metal carbonates, alkaline earth metal carbonates, epoxides and mixtures thereof, and reacting the resultant Diels-Alder adduct with thionyl chloride.

For the purpose of illustration, the following typical example is given of the process of the present invention.

I.

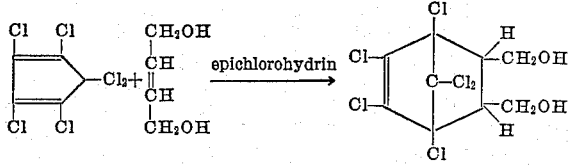

II.

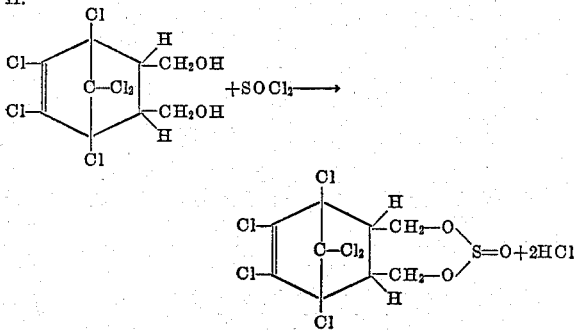

In the above example step I shows hexachlorocyclopentadiene reacted with cis-2-butenediol-1,4 in the presence of epichlorohydrin to form the Diels-Alder adduct, 1,4,5,6,7,7-hexachloro-2,3 - bis(hydroxy-methyl)bicyclo - (2.2.1) heptene-5. In step II the Diels-Alder adduct is reacted with thionyl chloride to form the organic cyclic sulfite 6,7,8,9,10,10 - hexachloro-1,5,5a,6,9,9a - hexahydro - 6,9- methano-2,4,3-benzodioxathiepin-3-oxide.

In United States Patent 2,799,685 by Frensch et al., issued on July 16, 1957, there is disclosed a process according to which a Diels-Alder adduct is prepared by reacting together hexachlorocyclopentadiene and an ester of an unsaturated dialcohol with, if desired, the application of pressure; the Diels-Alder adduct thus prepared is then transformed into the corresponding free alcohol. The organic cyclic sulfite product is then prepared by reacting the free alcohol with thionyl chloride.

According to the process of the present invention, the free alcohol is obtained directly by the Diels-Alder synthesis of an hexahalocyclopentadiene, preferably hexachlorocyclopentadiene, with an unsaturated dihydric alcohol in the presence of a compound of the class described. The organic cyclic sulfite product is then prepared by reacting the Diels-Alder adduct with thionyl chloride. In the process of the present invention there is no necessity of performing the Diels-Alder synthesis with an ester of an unsaturated dialcohol, and consequently no necessity for hydrolyzing the Diels-Alder adduct in order to obtain the free alcohol. In addition to this, the application of external pressure is unnecessary in the process of the present invention.

In the process of the present invention the unsaturated dihydric alcohol is slowly added, over a period of time, to an excess of hexahalocyclopentadiene. It has been found that optimum results are obtained when the time of addition of the dihydric alcohol is approximately one-quarter to one-half of the total reaction time; however, improved yields may be obtained when the time of addition of the dihydric alcohol varies between one-tenth of the total reaction time to a point equal to the total reaction time. The preferred ratio of hexahalocyclopentadiene to dihydric alcohol is greater than one mole of hexahalocyclopentadiene to one mole of dihydric alcohol.

An hypothesis, in accordance with much of the information at hand, is that most of the adduct is formed in the hexahalocyclopentadiene phase, the dihydric alcohol being poorly soluble in hexahalocyclopentadiene. Most of the dihydric alcohol decomposition occurs in the dihydric alcohol phase. If the volume of the hexahalocyclopentadiene phase is increased, the relative amount of dihydric alcohol available for reaction is correspondingly increased. The slow addition of dihydric alcohol to an excess of hexahalocyclopentadiene reduces the dihydric alcohol phase to a minimum.

It has been found, therefore, that organic cyclic sulfites may be obtained by (I) preparing the Diels-Alder adduct of an hexahalocyclopentadiene as the diene, wherein the halogen is selected from the group consisting of chlorine, bromine, fluorine and mixtures thereof, and an unsaturated dihydric alcohol as the dienophile, in the presence of a material selected from the group consisting of alkali metal carbonates, alkaline earth metal carbonates, epoxides and mixtures thereof, and (II) reacting said Diels-Alder adduct with thionyl chloride.

It has been further found that improved results are obtained when said dihydric alcohol is added slowly to an excess of said hexahalocyclopentadiene.

The process of the present invention provides numerous advantages over the prior art. The products may be prepared directly from the hexahalocyclopentadiene in a one-step process. The free alcohol is prepared directly in the Diels-Alder synthesis, eliminating the necessity of converting the ester to the alcohol and consequently, reducing the cost of the process by utilizing less equipment and less raw materials. The application of external pressure is unnecessary. In addition to the above, the process of the present invention enables the attainment of greater yields, and also shorter reaction times. Other advantages of the present invention will appear herein.

The halogen in the hexahalocyclopentadiene as used in this invention includes chlorine, bromine, fluorine, and mixtures thereof. The chlorine substituted cyclopentadiene is the most readily available commercially, and consequently, it is preferred.

The unsaturated dihydric compounds which are useful in this invention are the alcohols that form Diels-Alder adducts which would react with thionyl chloride to form organic cyclic sulfites; for example: cis-2-butenediol-1,4; cis - 2 - pentenediol-1,4; 1,2-bis-(hydroxymethyl)-cyclohexene-4; 1,2-bis(hydroxymethyl)-cyclohexadiene-1,4; 2,3-bis(hydroxymethyl)-bicyclo(2.2.1)heptene - 5; 2,3-bis (hydroxymethyl)-bicyclo(2.2.1)heptadiene-2,5; cis - 1,2- dihydroxycyclopentene-3; cis-1,3-dihydroxycyclopentene-4; 2,3-bis(hydroxymethyl)-5,6-epoxy-bicyclo(2.2.1)-heptene-2; and more generally those of the lower aliphatic and alicyclic series having at least one reactive unsaturated carbon-to-carbon bond and at least two hydroxy groups. Halogenated dihydric compounds may also be advantageously used; for example, 1,4-dihydroxy-2-chlorobutene-2; 1,4-dihydroxy-2,3-dichlorobutene-2; 1,4-dihydroxy-2,3-dichloropentene-3; 1,2 - bis(hydroxymethyl)-4-chlorocyclohexene-4; 1,2-bis(hydroxymethyl)-4,5-dichlorocyclohexene-4; 1,2-bis(hydroxymethyl)-4-chlorocyclohexadiene-1,4; 2,3-bis(hydroxymethyl)-5-chlorobicyclo(2.2.1)heptadiene-2,5; etc. In addition, the reaction products of polyhydric compounds having at least three hydroxy groups, one of which is esterified or etherified with an unsaturated alcohol or acid dienophile, is another class of compounds which may be reacted with a hexahalocyclopentadiene in the diene synthesis. Among such reactants which may be employed are allyl or vinyl glyceryl ethers, allyl or vinyl pentaerythritol ethers and unsaturated acid esters, such as, the acrylic and methacrylic esters of glycerol, pentaerythritol and similar polyhydroxy compounds.

Any material selected from the group consisting of alkali metal carbonates, alkaline earth metal carbonates, epoxides and mixtures thereof, are intended to be embraced in this invention. Examples of alkali metal carbonates include the carbonates of sodium, potassium, lithium, etc. Examples of alkaline earth metal carbonates include the carbonates of calcium, barium, magnesium, etc. Examples of epoxides include epichlorohydrin, allyl glycidyl ether, 1,2-epoxy-3-phenoxy propane, epoxidized soybean oil, butyl glycidyl ether, diisobutylene oxide, butadiene dioxide, diglycidyl ether, mono and diepoxides of 4-vinyl cyclohexene, allyl glycidyl ethers of various 2,2'-bis(4-hydroxyphenyl)propanes (bisphenol A), 2-2,4-trimethyl-3,4-epoxy pentane, 3,4-epoxy cyclohexane carbonitrile, 2,3-epoxy-2-ethyl hexanol, octylene oxide, etc. It should be noted that the material employed should be substantially unreactive under the conditions of the reaction, i.e., those materials that would be slowly reactive under certain conditions are not precluded; for example, epichlorohydrin under certain conditions would react slowly with butenediol. The concentration of the acid acceptor may be varied over a wide range without effecting the yields, but generally speaking, should be present in from two–ten milliliters or 2–10 grams per mole of dihydric alcohol.

As heretofore indicated the addition of a material of the class described enables the attainment of many advantages, but the exact mechanism whereby these advantages are attained is not fully understood.

A solvent may or may not be employed in the diene synthesis; if used, it should be inert with respect to the reactants and the reaction products and should have a sufficienly high boiling point to allow for reaction at elevated temperatures without necessitating the application of superatmospheric pressure. The solvents which may be used, for example, include dioxane, epichlorohydrin, monochlorobenzene, dichlorobenzene, chlorobenzene, n-butanol, toluene, xylene, benzene, butyl Cellosolve, methyl Cellosolve, methyl isobutyl ketone, diethyl carbitol, tertiary butyl alcohol, benzyl alcohol, normal amyl alcohol, tertiary amyl alcohol, acetonitrile, isobutyronitrile, etc. The amount of solvent will be determined by the reaction temperatures desired, and in general the amount of solvent may be used to control the reaction temperatures. The Diels-Alder adduct thus prepared may be then isolated from solvents and excess hexahalocyclopentadiene by filtration. The mother liquors and washings from the Diels-Alder reaction may be recycled either with or without purification by distillation, and in addition, may if desired, be treated with magnesium oxide or other basic absorbent to remove any impurities that might exist.

The reaction temperatures employed are greater than about seventy-five degrees centigrade, and in order to give practical reaction times are preferably between about one hundred and twenty-five degrees centigrade and about two hundred and fifty degrees centigrade. In general, the reaction may be run at reflux temperatures, thereby obviating the necessity of a temperautre regulating device. The time of reaction is not critical but will vary with the degrees of completion of the reaction desired and the operational temperature used. Generally speaking, however, high yields are obtained with reaction times in the order of from about twenty minutes to about twenty hours.

The reaction mixture may, if desired, be continuously stirred, although this is not necessary to the process of the present invention. In addition, during the course of the reaction, the small quantity of water formed may be constantly removed from the reaction mixture by azeotropic distillation or other methods known to the art.

Illustrative examples of some of the aforementioned adducts include the following: 1,4,5,6,7,7-hexachloro-2,3-bis(hydroxymethyl) - bicyclo - (2.2.1)heptene - 5; 1,4,5,6-tetrachloro-7,7-difluoro-2,3-bis(hydroxymethyl) - bicyclo-(2.2.1) heptene-5; 1,4,5,6,7,7-hexabromo-2,3-bis(hydroxymethyl)-bicyclo-(2.2.1)heptene - 5; 1,2,4,5,6,7,7 - heptachloro-2,3-bis(hydroxymethyl)-bicyclo-(2.2.1)heptene - 5; 1,2,3,4,5,6,7,7-octochloro-2,3-bis(hydroxymethyl) - bicyclo-(2.2.1)-heptene-5; 1,2,4,5,6-pentachloro-7,7-difluoro-2,3-bis(hydroxymethyl)-bicyclo-(2.2.1)heptene-5; 1,2,3,4, 5,6-hexachloro-2,3-bis(hydroxymethyl) - bicyclo - (2.2.1) heptene-5; 1,4,5,6,7,7 - hexabromo - 2-chloro-2,3-bis-(hydroxymethyl)-bicyclo-(2.2.1)heptene-5; 1,4,5,6,7,7-hexabromo - 2,3 - dichloro - 2,3-bis(hydroxymethy)-bicyclo-(2.2.1)heptene-5. This list of compounds is merely intended to be illustrative and not limitative.

The Diels-Alder adduct thus prepared is then reacted with thionyl chloride to give an organic cyclic sulfite. A solvent should be employed which has a sufficiently high boiling point to allow for reaction at elevated temperatures without necessitating the application of superatmospheric pressure. Suitable solvents include: thionyl chloride, methylene chloride, chloroform, carbon tetrachloride, benzene, toluene, and xylene. The amount of solvent can be varied over a wide range without affecting the yields, but generally speaking, it should be present in at least 0.5 cubic centimeter or greater per gram of Diels-Alder adduct. The cyclic sulfites may then be isolated from solution by distilling off the solvent by procedures known in the art. The product thus obtained is the residue and may be cast or flaked by procedures known in the art. The product is of high purity; however, if desired, its purity may be raised by methods known to the art, such as recrystallization.

The entire operation may be run as a one-step process by adding thionyl chloride directly to the Diels-Alder reaction mixture.

In general the ratio of the Diels-Alder adduct to thionyl chloride may be varied from one mole or greater of thionyl chloride per mole of Diels-Alder adduct; however, optimum results are obtained when approximately one hundred percent excess of thionyl chloride is employed, e.g., a higher purity product is obtained.

The temperatures employed in the reaction between the Diels-Alder adduct and thionyl chloride are greater than room temperature and preferably between about fifty degrees centigrade and the reflux temperature of the reaction mixture. The time of reaction is not critical but will vary with the degree of completion of the reaction desired, and the operational temperature used; for example, the reaction time may vary between several minutes and several hours.

In the reaction between thionyl chloride and the Diels-Alder adduct, hydrogen chloride is evolved and may be recovered by procedures known in the art.

Examples of some of the organic cyclic sulfites prepared by the process of the present invention include: 6,7,8,9,10,10 - hexachloro-1,5,5a,6,9,9a - hexahydro - 6,9-methano-2,4,3-benzodioxathiepin-3-oxide; 6,7,8,9 - tetrachloro-10,10-difluoro-1,5,5a,6,9,9a-hexahydro - 6,9-methano-2,4,3-benzodioxathiepin-3-oxide; 6,7,8,9,10,10-hexabromo-1,5,5a,6,9,9a-hexahydro - 6,9 - methano - 2,4,3 - benzodioxathiepin - 3 - oxide; 5a,6,7,8,9,10,10 - heptachloro - 1,5,5a,6,9,9a - hexahydro - 6,9 - methano - 2,4,3-benzodioxathiepin - 3 - oxide; 5a,6,7,8,9,9a,10,10 - octochloro - 1,5,5a,6,9,9a-hexahydro - 6,9 - methano - 2,4,3-benzodioxathiepin - 3 - oxide; 6,7,8,9,9a-pentachloro-10,10 - difluoro - 1,5,5a,6,9,9a - hexahydro - 6,9 - methano-2,4,3 - benzodioxathiepin - 3 - oxide; 5a,6,7,8,9,9a - hexachloro - 1,5,5a,6,9,9a - hexahydro - 6,9 - methano - 2,4,3-benzodioxathiepin - 3 - oxide; 6,7,8,9,10,10 - hexabromo-9a - chloro - 1,5,5a,6,9,9a - hexahydro - 6,9 - methano-2,4,3 - benzodioxathiepin - 3 - oxide; 6,7,8,9,10,10 - hexabromo - 5a,9a - dichloro - 1,5,5a,6,9,9a - hexahydro - 6,9-methano-2,4,3-benzodioxathiepin-3-oxide. This list of compounds is intended to illustrative and not limitative.

The compounds prepared by the process of the present invention find utility as herbicides, fungicides, and insecticides. They also may be used for protecting wood, paper, textiles and leather. Furthermore, they find utility as disinfectants. The intermediate Diels-Alder adducts are useful in the preparation of polyester resins, in the preparation of plasticizers for polyvinyl compounds, and also in the preparation of alkyd resins.

It should be noted that the foregoing process lends itself readily to use on a commercial scale.

In order that those skilled in the art may have sufficiently detailed instructions in practicing the process of the present invention, the following examples will illustrate typical procedures. This detailed disclosure is not to be construed as limiting the scope of the present invention as further indicated elsewhere herein.

*Example 1*

A three-necked flask was fitted with a stirrer, thermometer, dropping funnel, moisture trap (Barrett receiver) and a condenser. Toluene is added to a stirred refluxing solution of eighty milliliters of toluene, five hundred and forty-six grams of hexachlorocyclopentadiene (two moles) and three milliliters of epichlorohydrin until a reflux temperature of one hundred and fifty-five degrees centigrade is achieved. The total volume of toluene required will be about one hundred milliliters. After the moisture that is present in the reagents has been removed by azeotropic distillation, eighty-eight grams of cis-2-butenediol-1,4 (one mole) is continuously added over a four-hour period. Stirring and refluxing is maintained for four additional hours. Water, 0.2 to 2.0 milliliters, is constantly removed at the moisture trap. If the moisture is not removed the reflux temperature of the mixture will be depressed. In addition, there is less tendency for foam formation when the water is removed as formed. After the total reaction time of eight hours has elapsed, the mixture is cooled to approximately twenty-five degrees centigrade and filtered. The filter cake is thoroughly washed with three hundred milliliters of toluene. The dry filter cake was identified as 1,4,5,6,7,7-hexachloro-2,3-bis(hydroxymethyl)-bicyclo-(2.2.1)heptene-5; by comparison of the infra-red spectrum with that of an authentic sample, and by melting point determination of the recrystallized product. The melting point was found to be from two hundred and seven to two hundred and eight degrees centigrade, which corresponds to the melting point cited in the art. The product weighed approximately three hundred and eight grams (approximately eighty-five percent yield).

*Example 2*

Three hundred grams of 1,4,5,6,7,7-hexachloro-2,3-bis(hydroxymethyl)-bicyclo-(2.2.1)heptene-5; as prepared in Example 1 (0.832 mole) was placed in a three-necked flask equipped with a stirrer, dropping funnel, thermometer and condenser. The condenser exit is connected to an HCl trap. Toluene, three hundred milliliters, is added and the stirrer is started. Thionyl chloride, one hundred and ninety-eight grams (1.66 mole) is added to the slurry (room temperature) via the dropping funnel in about thirty seconds. The mixture is heated to reflux at about one hundred and nineteen degrees centigrade over a period of two hours. The solution is cooled to room temperature, filtered to remove a few milligrams of foreign particles, and stripped. The stripping is carried to a final pot temperature and pressure of one hundred and fifty degrees centigrade and twelve millimeters and the residue is then cast. The product was identified as 6,7,8,9,10,10-hexachloro - 1,5,5a,6,9,9a - hexahydro - 6,9-methano - 2,4,3-benzodioxathiepin-3-oxide by comparison of the infra-red spectrum with that of an authentic sample, and by chemical analysis. The product was obtained in ninety-nine point five percent (three hundred and thirty-six grams) yield from the Diels-Alder adduct.

In a manner after Example 1, and under substantially the same conditions unless otherwise stated, the Diels-Alder adduct of hexachlorocyclopentadiene and cis-2-butenediol-1,4 was prepared. Variations in the molar quantities of reactants, additive employed, amount of additive employed, addition times, total reaction times and reaction temperature with consequent variation of yields are shown.

|  | Moles of Hexachlorocyclopentadiene per Mole of Butenediol | Amount of Additive | Time of Addition of Butenediol (hours) | Total Time of Reaction (hours) | Temperature Range (Degrees Centigrade) | Yield Percent |
|---|---|---|---|---|---|---|
| Example 3 | 1 | none | | 8 | 145 | 38 |
| Example 4 | 1 | 10 milliliters epichlorohydrin | | 8-10 | 139-145 | 59 |
| Example 5 | 1 | 10 grams epoxidized soyabean oil | | 9 | 138-145 | 63 |
| Example 6 | 1 | 10 grams calcium carbonate | | 21 | 127-140 | 66 |
| Example 7 | 2 | none | 3 | 9 | 149-155 | 77 |
| Example 8 | 3 | 6.6 milliliters epichlorohydrin | | 12 | 143-145 | 78 |
| Example 9 | 2 | 5 grams calcium carbonate | 2 | 8 | 150-155 | 81 |
| Example 10 | 2 | 10 milliliter allyl glycidyl ether | 2 | 6 | 151-156 | 82 |
| Example 11 | 2 | 10 milliliters 1,2-epoxy-3-phenoxy propane | 2 | 8 | 150-156 | 83 |
| Example 12 | 4 | 3 milliliters epichlorohydrin | 0.4 | 2 | 184-186 | 85 |
| Example 13 | 6 | 3 milliliters epichlorohydrin | 0.067 | 0.33 | 200 | 84 |
| Example 14 | 6 | 2 milliliters epichlorohydrin | 2 | 8 | 155-156 | 92 |

Example 15

1,4,5,6,7,7 - hexachloro - 2,3 - bis(hydroxymethyl) - bicyclo-(2.2.1)heptene-5; was prepared (but not isolated from the reaction mixture) from two hundred and seventy-three grams of hexachlorocyclopentadiene (one mole), forty-four grams of cis-2-butenediol-1,4 (0.5 mole) in the presence of 1.5 milliliter of epichlorohydrin and sixty-five milliliters of toluene in a manner after Example 1. Thionyl chloride, forty milliliters (0.55 mole) was added to the stirred reaction mixture (room temperature) and the mixture was heated to reflux (one hundred and twenty-three degrees centigrade) during 1.5 hours. The solution was cooled to room temperature, three milliliters of additional thionyl chloride (0.05 mole) was added, and the solution was heated to reflux again. The solution was then concentrated to a pot temperature of one hundred and fifty-eight degrees centigrade at 1.2 millimeters pressure, leaving a residue of one hundred and seventy-eight grams (87.5 percent yield from butenediol). The product was identified as 6,7,8,9,10,10-hexachloro-1,5,5a,6,9,9a-hexahydro-6,9 - methano - 2,4,3 - benzodioxathiepin-3-oxide by comparison of the infra-red spectrum with that of an authentic sample and by chemical analysis. The overall yield from butenediol, calculated as one hundred percent product, was seventy-seven percent.

This invention may be embodied in other forms or carried out in other ways without departing from the spirit or essential characteristics thereof. The present embodiment is therefore to be considered as in all respects, illustrative, and not restrictive, the scope of the invention being indicated by the appended claims, and all changes which come within the meaning and range of equivalency of the claims are intended to be embraced therein.

We claim:

1. A process for the preparation of an unsaturated halogen-substituted polycyclic sulfite which comprises reacting a hexahalocyclopentadiene, wherein the halogen component of said hexahalocyclopentadiene is selected from the group consisting of chlorine, bromine, fluorine and mixtures thereof, with an unsaturated dihydric alcohol selected from the group consisting of a lower aliphatic unsaturated dihydric alcohol and a lower alicyclic unsaturated dihydric alcohol, wherein said unsaturated dihydric alcohol contains at least one reactive unsaturated carbon-to-carbon bond, in a proportion equivalent to between about one and about six moles of said hexahalocyclopentadiene per mole of said unsaturated dihydric alcohol, said reaction being effected in the presence of a material selected from the group consisting of an alkali metal carbonate, an alkaline earth metal carbonate, an epoxide and mixtures thereof, said epoxide being selected from the group consisting of epichlorohydrin, allyl glycidyl ether, 1,2-epoxy-3-phenoxy propane, epoxidized soyabean oil, butyl glycidyl ether, diisobutylene oxide, butadiene dioxide, diglycidyl ether, mono epoxides of 4-vinyl cyclohexene, diepoxides of 4-vinyl cyclohexene, allyl glycidyl ethers of 2,2'-bis(4-hydroxyphenyl) propane, 2,2,4-trimethyl-3,4-epoxy pentane, 3,4-epoxy cyclohexane carbonitrile, 2,3-epoxy-2-ethyl hexanol, and octylene oxide, said reaction being effected at a temperature between about seventy-five degrees centigrade and about two hundred and fifty degrees centigrade for a period between about twenty minutes and about twenty hours, reacting the resulting reaction product with thionyl chloride at a temperature between about fifty degrees centigrade and the reflux temperature, and recovering the resulting unsaturated halogen-substituted polycyclic sulfite product produced thereby.

2. The process according to claim 1 wherein said hexahalocyclopentadiene is hexachlorocyclopentadiene, wherein said unsaturated dihydric alcohol is cis-2-butenediol-1,4 and wherein said unsaturated halogen-substituted polycyclic sulfite product is 6,7,8,9,10,10-hexachloro-1,5,5a, 6,9,9a - hexahydro-6,9-methano-2,4,3-benzodioxathiepin-3-oxide.

3. The process according to claim 2 wherein the molar ratio of said hexachlorocyclopentadiene to said unsaturated dihydric alcohol is in the range of greater than 1:1 and up to about 6:1.

4. The process according to claim 3 wherein said unsaturated dihydric alcohol is added slowly to said hexachlorocyclopentadiene, during a period equivalent to between about one-tenth of the reaction time and about the total reaction time.

5. The process according to claim 4 wherein said material is epichlorohydrin.

6. The process according to claim 4 wherein said material is calcium carbonate.

7. A process according to claim 4 wherein said material is allyl glycidyl ether.

8. The process according to claim 4 wherein said material is 1,2-epoxy-3-phenoxy propane.

9. A process for the preparation of an unsaturated halogen-substituted polycyclic sulfite which comprises reacting a hexahalocyclopentadiene, wherein the halogen component of said hexahalocyclopentadiene is selected from the group consisting of chlorine, bromine, fluorine and mixtures thereof, with an unsaturated dihydric alcohol selected from the group consisting of a lower aliphatic unsaturated dihydric alcohol and a lower alicyclic unsaturated dihydric alcohol wherein said unsaturated dihydric alcohol contains at least one reactive unsaturated carbon-to-carbon bond, in a proportion equivalent to between about one and about six moles of said hexahalocyclopentadiene per mole of said unsaturated dihydric alcohol, said reaction being effected at a temperature between about seventy-five degrees centigrade and about two hundred and fifty degrees centigrade, wherein said unsaturated dihydric alcohol is added to said hexahalocyclopentadiene at a rate equivalent to between about one-tenth of the reaction time and about the total reaction time, reacting the resulting reaction product with thionyl chloride at a temperature between about fifty degrees centigrade and the reflux temperature, and recovering the resulting unsaturated halogen-substituted polycyclic sulfite product produced thereby.

10. The process according to claim 9 wherein said hexahalocyclopentadiene is hexachlorocyclopentadiene, wherein said unsaturated dihydric alcohol is cis-2-butenediol-1,4, and wherein said unsaturated halogen-substituted polycyclic sulfite product is 6,7,8,9,10,10-hexachloro-1,5, 5a,6,9,9a - hexahydro - 6,9-methano-2,4,3-benzodioxathiepin-3-oxide.

11. A process for the preparation of a Diels-Alder adduct of hexahalocyclopentadiene as the diene wherein the halogen component of said hexahalocyclopentadiene is selected from the group consisting of chlorine, bromine, fluorine and mixtures thereof, and an unsaturated dihydric alcohol as the dienophile, wherein said unsaturated dihydric alcohol is selected from the group consisting of lower aliphatic unsaturated dihydric alcohols and lower alicyclic unsaturated dihydric alcohols, and wherein said alcohol contains at least one reactive unsaturated carbon-to-carbon bond, which comprises reacting said hexahalocyclopentadiene with said unsaturated dihydric alcohol in a proportion equivalent to between about one and about six moles of said hexahalocyclopentadiene per mole of said unsaturated dihydric alcohol at a temperature between about seventy-five degrees centigrade and about two hundred and fifty degrees centigrade for between about twenty minutes and about twenty hours, said reaction being effected in the presence of a material selected from the group consisting of an alkali metal carbonate, an alkaline earth metal carbonate, an epoxide and mixtures thereof, said epoxide being selected from the group consisting of epichlorohydrin, allyl glycidyl ether, 1,2-epoxy-3-phenoxy propane, epoxidized soyabean oil, butyl glycidyl ether, diisobutylene oxide, butadiene dioxide, diglycidyl ether, monoepoxides of 4-vinyl cyclohexene, diepoxides of 4-vinyl cyclohexane, allyl glycidyl ethers of 2,2'-bis(4-hydroxyphenyl) propane, 2,2,4-trimethyl-3,4-epoxy pentane, 3,4-epoxy pentane, 3,4-epoxy cyclohexane carbonitrile, 2,3-epoxy-2-ethyl hexanol, and octylene oxide, and recovering the resulting Diels-Alder adduct of hexahalocyclopentadiene produced thereby.

12. The process according to claim 11 wherein said hexahalocyclopentadiene is hexachlorocyclopentadiene, wherein said unsaturated dihydric alcohol is cis-2-butenediol-1,4, and wherein said adduct is 1,4,5,6,7,7-hexachloro-2,3-bis(hydroxymethyl)-bicyclo-(2.2.1)heptene-5.

13. The process according to claim 12 wherein the molar ratio of said hexachlorcyclopentadiene to said unsaturated dihydric alcohol is in the range of greater than 1:1 and up to about 6:1.

14. The process according to claim 13 wherein said unsaturated dihydric alcohol is added slowly to said hexachlorocyclopentadiene during a period equivalent to between about one-tenth of the reaction time and about the total reaction time.

References Cited in the file of this patent
UNITED STATES PATENTS
2,799,685   Frensch et al. _____ July 16, 1957